(12) United States Patent
Chan (10) Patent No.: US 8,733,965 B2
(45) Date of Patent: May 27, 2014

(54) LED ILLUMINATING STREET LAMP WITH POWER GENERATION SYSTEM

(76) Inventor: Sze Keun Chan, Hong Kong (CN)

( * ) Notice: Subject to any disclaimer, the term of this patent is extended or adjusted under 35 U.S.C. 154(b) by 228 days.

(21) Appl. No.: 13/498,136

(22) PCT Filed: Sep. 20, 2010

(86) PCT No.: PCT/CN2010/001444
§ 371 (c)(1),
(2), (4) Date: Sep. 5, 2012

(87) PCT Pub. No.: WO2011/035537
PCT Pub. Date: Mar. 31, 2011

(65) Prior Publication Data
US 2012/0320573 A1 Dec. 20, 2012

(30) Foreign Application Priority Data
Sep. 24, 2009 (CN) .......................... 2009 1 0176666

(51) Int. Cl.
*F21L 4/00* (2006.01)
*F21L 13/00* (2006.01)

(52) U.S. Cl.
USPC ........... 362/192; 362/193; 362/183; 362/276; 362/431

(58) Field of Classification Search
CPC ............. F21S 9/00; F21S 9/026; F21S 9/028; F21S 9/03; F21S 9/032; F21S 9/035; F21S 9/043; F21S 9/46; F21S 8/00; F21S 8/085; F21S 8/086; F21S 8/088; F21V 21/00; F21V 21/10; F21V 21/116; F21L 4/00; F21L 4/02; F21L 4/08; F21L 13/00

USPC ......... 362/183, 192, 193, 414, 341, 276, 802; 290/1 R
See application file for complete search history.

(56) References Cited

U.S. PATENT DOCUMENTS

| | | | |
|---|---|---|---|
| 4,200,904 A * | 4/1980 | Doan | 362/183 |
| 5,367,442 A | 11/1994 | Frost et al. | |
| 8,040,102 B2 * | 10/2011 | Kao et al. | 320/101 |
| 8,106,593 B2 * | 1/2012 | Nevins | 315/149 |
| 8,148,833 B2 * | 4/2012 | Chang et al. | 290/1 R |
| 8,350,482 B2 * | 1/2013 | Nevins | 315/149 |
| 2008/0037243 A1 * | 2/2008 | Discoe et al. | 362/183 |
| 2009/0080182 A1 * | 3/2009 | Huang | 362/183 |
| 2009/0237918 A1 * | 9/2009 | Yang | 362/183 |
| 2009/0303703 A1 * | 12/2009 | Kao et al. | 362/183 |
| 2010/0220467 A1 * | 9/2010 | Daidone et al. | 362/183 |

FOREIGN PATENT DOCUMENTS

| | | |
|---|---|---|
| CN | 201221720 Y | 4/2009 |
| CN | 201225242 Y | 4/2009 |
| CN | 201273511 Y | 7/2009 |
| CN | 201547644 U | 8/2010 |

* cited by examiner

*Primary Examiner* — Thomas Sember
(74) *Attorney, Agent, or Firm* — McNeely, Hare & War LLP; Kevin J. McNeely (57) ABSTRACT

An LED illuminating street lamp with a power generation system includes a thermal power generation system with a heat-absorbing power generation vacuum tube, a road surface pressure device connected with a pressure power generation system, and a solar power generation system. The solar power generation system, the thermal power generation system, and the pressure power generation system are connected with a central controller. The central controller is connected with a DC/DC converter.

20 Claims, 7 Drawing Sheets

LED ILLUMINATING STREET LAMP WITH POWER GENERATION SYSTEM

CROSS REFERENCE TO RELATED APPLICATIONS

This utility patent application filed under 35 USC §371 is a national phase entry of PCT/CN2010/001444 filed on Sep. 20, 2010 and claims priority to Chinese patent application 200910176666.1 filed on Sep. 24, 2009, which are incorporated by reference herein.

TECHNICAL FIELD

This invention relates to a light emitting diode (LED) illuminating street lamp with a power generation system, and more particularly to an LED illuminating street lamp which uses green energy resources like thermal power, light energy, air pressure or hydraulic pressure as its electric power generation system

BACKGROUND

The shortage of the energy sources and environmental problems are the increasingly serious problems of the earth. Street lamps are the necessary facilities which are used on the streets world-widely. The electric energy yearly consumed by these street lamps becomes the serious burden of the governments.

The applicant filed a patent named SOLAR POWERED LED STREET LAMP WITH AUTOMATIC LIGHT CONTROL on May 9, 2005 (PCT/CN2006000920). That patent used solar energy as the power of street lamp and used LEDs as the illuminating source. That patent uses solar photovoltaic board to collect solar energy and convert to electric energy, but only used the lighting part of solar, the major heat energy of solar is not applied. Vehicles running on the streets consume energy, but can produce new kind of energy as well which is still not used effectively. The present green energy used in the street lighting facilities cannot produce the fully necessary electric power, thus, the traditional electric power is always used in conjunction with the green energy sources in the lighting facilities.

SUMMARY

It is, therefore, an object of the invention to solve the present technical shortage or problems and to provide an LED illuminating street lamp with power generation system, which uses lighting and thermal power of the sun as its power generation, and the air pressure generation or the magnetic power generation by using of the pressure of the running vehicles, to provide electricity to the lamp, and which uses LEDs as its lighting source and the wall of the lamppost is a heat-absorbing power generation vacuum tube.

These objects are accomplished by a LED illuminating street lamp, a central controller (MCU), a solar power generation system, a thermal power generation system, a road surface pressure device connected with a pressure power generation system, a rectifier, a DC/DC converter and an electric power storage device. The said LED illuminating street lamp is comprised of a lamppost, a lamppost mouth, a heat-absorbing power generation vacuum tube with a transparent or translucent tube covered around, lamppost feet and a LED lamp, a vane wheel generator is mounted in the lamppost mouth, the said LED lamp is installed on the lamp bracket, an air tube or a magnetic liquid tube is installed in the lamppost, and there are many air holes in the bottom of the lamppost, lamp bracket and lamppost feet.

The general feature of the invention is that the said solar power generation system, thermal power generation system, pressure power generation system are connected to the central controller, the central controller controls the electricity generation, storage and utilization, to supply the electricity to the LED illuminating street lamp and other electrical appliances after the rectification process through the rectifier and DC/DC converter transformation process, and the electric energy can be stored into the power storage device.

The implementation of the solar power generation system is that there are two supports on the lamppost mouth to support the solar photovoltaic board, below which there is a power storage device installed. The solar photovoltaic board collects solar power and the electric energy converted from the solar energy can be stored into the power storage device. The outer and inner layer of the heat-absorbing power generation vacuum tube is the painted solar cell layer which can absorb the solar energy.

The implementation of the thermal power generation system is that a vane wheel generator is mounted in the lamppost mouth, the wall of the lamppost is the heat-absorbing power generation vacuum tube with a transparent or translucent tube covered around. At the bottom of the lamppost, there are many lamppost feet and heat-absorbing blocks. There are also many air holes in the bottom part of the lamppost and the lamppost feet so that the air runs into the lamppost. When sun shines on the lamppost, the heat-absorbing power generation vacuum tube, the lamppost feet and the heat-absorbing blocks absorb lots of heat, the air temperature in the lamppost is rising rapidly and the air flows fast to the top of the lamppost to drive the vane blades rotating, the vane wheel generator begin generating electricity. The electricity can be stored in a power storage device and supplies the electricity to the LED illuminating street lamp and other electrical appliances. The outer and inner layer of the heat-absorbing power generation vacuum tube is the painted solar cell layer which can strongly absorb the solar energy to convert into electricity. The lamppost feet are hollow and expand in different directions in order to increase the area for receiving the sunshine and absorb much more heat.

The features of the thermal power generation system of the invention are: the said heat-absorbing power generation vacuum tube and the transparent or translucent tube are vacuum, so the heat can be maintained for a long time, which can be released during night time to force the air in the lamppost to flow upward to drive the vane wheel generator to generate electricity continuously; the painted solar cell layer is consisted of many painted solar cell slices or solar crystalline chips to be pasted one by one, in this way, the problem of the irregular shape of the lamppost and the different angles of the joints between the lamppost and other parts can be solved.

The pressure power generation system is an air pressure power generation system, the implementation is that there is a road surface pressure device beside the lamppost, which comprises of road surface layer, roadbed, a plate in the road surface layer, a force pump connected with the plate and located in a tank, an air tube at the bottom of the tank which passes through the bottom of the lamppost and goes through the whole lamppost till the lamppost mouth, a nozzle at the top of the air tube above which is the vane blades of the vane wheel generator. When the automobiles run through the road or people walk on the road, the wheels or feet pressure over the plate to press the force pump, the force pump compress the air in the tank so that the air rises rapidly through the air tube and spurts out from the nozzle to rotate the vane blade and then the vane wheel generator starts to work to generate electricity.

The pressure power generation system can also be an hydraulic pressure magnetic generation system, the implementation is that there is a road surface pressure device beside the lamppost, which comprises of road surface layer, roadbed, a plate in the road surface layer, a force pump connected with the plate and located in a tank, magnetic liquid in the tank, a magnetic liquid tube at the bottom of the tank which passes through the bottom of the lamppost and goes through the whole lamppost till the lamppost mouth, a nozzle at the top of the magnetic liquid tube above which is the vane blades of the vane wheel generator, a backflow tube below the vane wheel generator, a magnetic generator around the magnetic liquid tube.

When the automobiles run through the road, the wheels pressure over the plate to press the force pump, the force pump compress the magnetic liquid in the tank so that the magnetic liquid rises rapidly through the magnetic liquid tube and spurts out from the nozzle to rotate the vane blade and then the vane wheel generator starts to work to generate electricity. The magnetic generator generates electricity when magnetic liquid passes by. The magnetic liquid spurted out from the nozzle will flow back to the tank along the backflow tube.

Another feature of the invention is that several kinds of power generation systems are combined together, which can insure the power supply. And a socket is installed at the bottom of the lamppost to supply the electricity.

A further feature of the invention is that the LEDs are used as its lighting source. LED is a kind of green lighting source which is high lumen output, long life time, radiationless, and power saving. The said LED lamp comprises Lamp box, PCB board, and a plurality of LEDs mounted on the PCB. These LEDs are connected in parallel or in series and can be embedded into a light-scattering plate so that the light can be scattered into different angles. The lamp box is made of transparent or translucent material.

One more feature of the invention is that an advertising board can be installed in the lamppost. The LED or other luminescent material can be used in the advertising board as its lighting source and the electricity is from the electric energy stored power storage device. The said advertising board is for the purpose of advertisement and it could also be a kind of illumination device.

Another feature of the invention is that a signal transceiver is installed on the lamppost.

The advantage of the invention is that all the power sources are from nature, including solar, thermal power, air pressure and hydraulic pressure. And multiple power generation systems are combined together to ensure power supply of the street lamp without using the traditional power source. And the unused electric energy can be store in the power storage device to supply the electricity to advertising board on the road side, traffic signals and other electrical appliances, even to the electric vehicles in the future.

For a better understanding of the invention, the objects, characteristics and advantages of the invention are illustrated in details through drawings and the written description.

DETAILED DESCRIPTION

In the drawings, 1 is a lamppost, 2 is an LED lamp, 3 is a vane wheel generator, 4 is a solar photovoltaic board, 5 is an electric power storage device, 6 is an air tube, 7 is a magnetic generator, 8 is road surface, 9 is an electrical socket, 10 is a lamppost mouth, 11 is a lamp bracket, 12 is lamppost feet, 13 is an air holes, 14 is heat-absorbing power generation vacuum tube, 15 is painted solar cell layer, 151 is painted solar cell slices, 16 is transparent or translucent tube, 17 is heat-absorbing blocks, 18 is an advertising board, 19 is a signal transceiver, 21 is a lamp box, 21 is a PCB board, 23 is light emitting diodes (LEDs), 24 is light-scattering plates, 31 is vane blades, 32 is fixing holders, 41 is a bracket, 60 is a magnetic liquid tube, 61 is a nozzle, 61 is a back flow tube, 80 is roadbed, 81 is a plate, 82 is a pressure pump, 83 is a tank, 101 is the top cylinder of the lamppost, 102 is the middle cylinder of the lamppost and 103 is the bottom cylinder of the lamppost.

Figure 1:
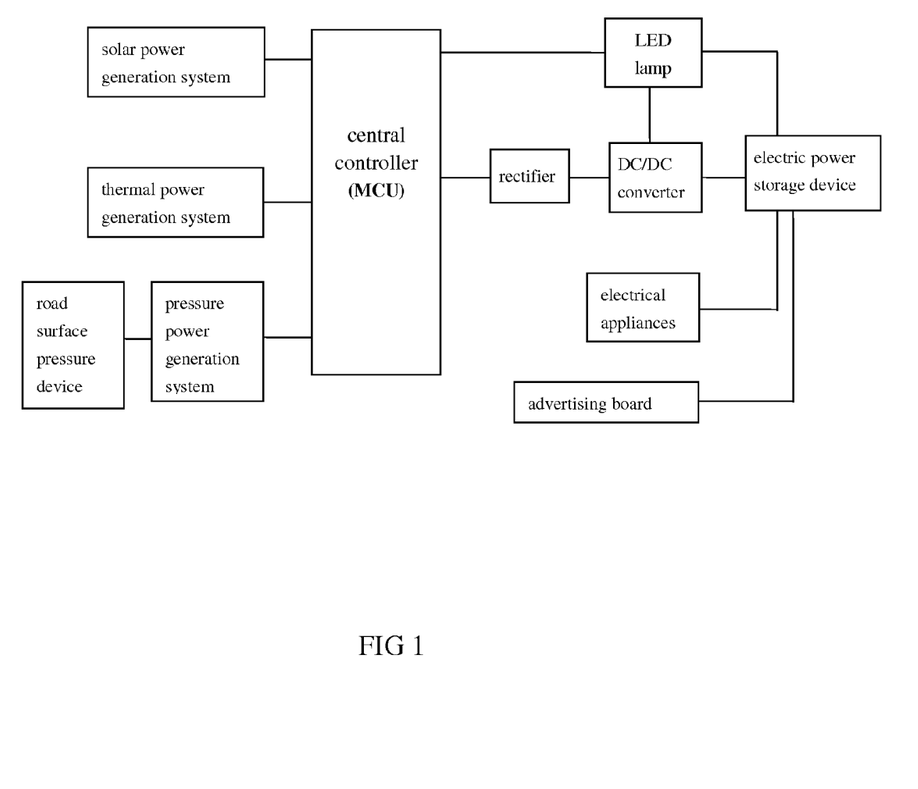
FIG. 1 is a system connection diagram of the LED illuminating street lamp with a power generation system.

As shown in FIG. 1, a LED illuminating street lamp with power generation system comprises a LED illuminating street lamp, a central controller (MCU), a solar power generation system, a thermal power generation system, a road surface pressure device connected with a pressure power generation system, a rectifier, a DC/DC converter and an electric power storage device. The solar power generation system, thermal power generation system and pressure power generation system are connected to the central controller, the central controller controls the electricity generation, storage and utilization, to supply the electricity to the LED illuminating street lamp and other electrical appliances after the rectification process through the rectifier and DC/DC converter transformation process, and the rest electric energy is stored into the power storage device (5).

Figure 2:
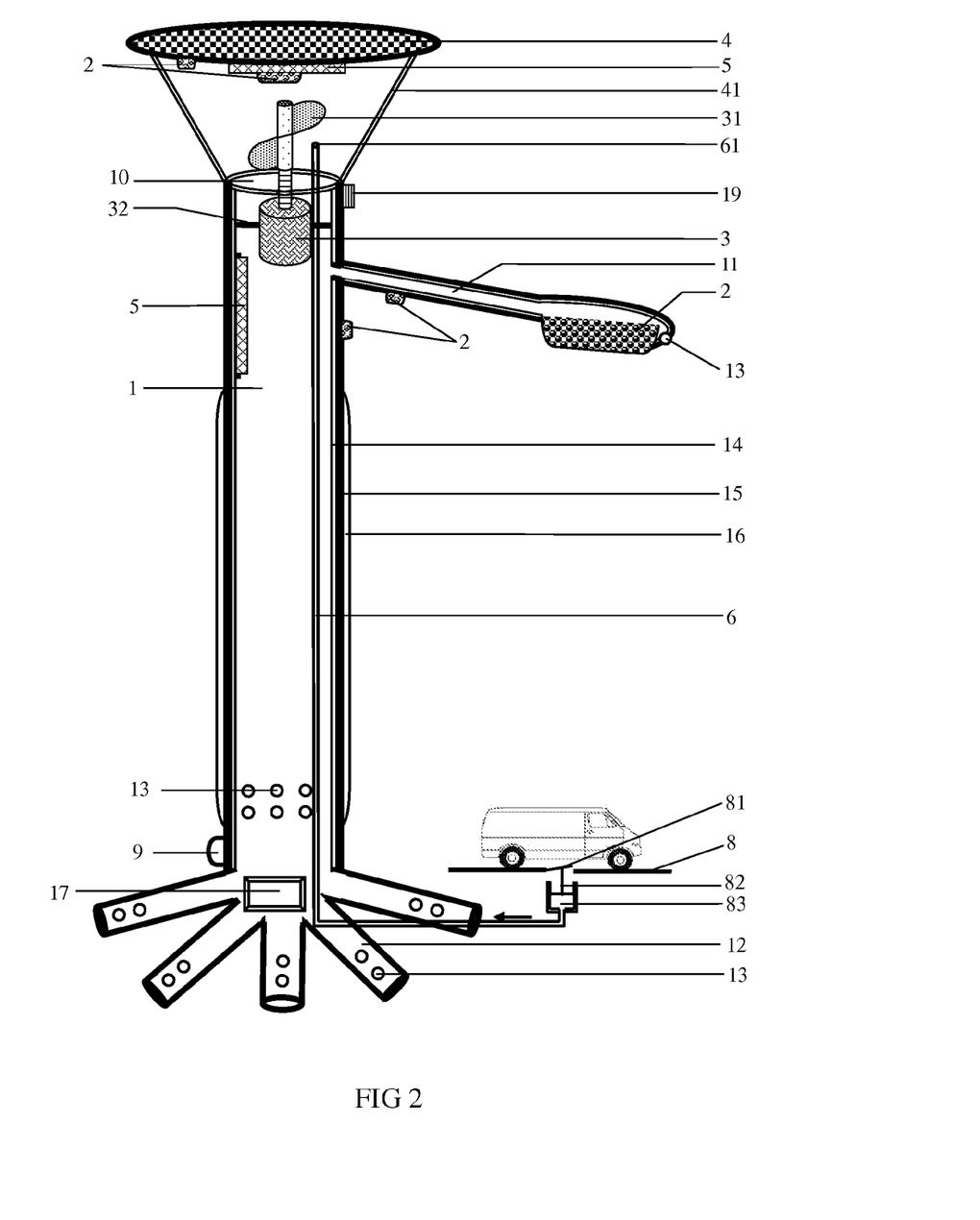
FIG. 2 is a structural view of the LED illuminating street lamp with a power generation system.

As show in FIG. 2, the LED illuminating street lamp is comprised of a lamppost (1) which is central hollow, a lamp bracket (11), a lamppost mouth (10), a heat-absorbing power generation vacuum tube (14), lamppost feet (12) and a LED lamp (2), a vane wheel generator (3) mounted in the lamppost mouth (10), the said LED lamp (2) is installed on the lamp bracket (11), an air tube (6) is installed in the lamppost (1), and there are many air holes (13) in the bottom of the lamppost (1), lamp bracket (11) and lamppost feet (12). The lamppost (1) is a cylindrical lamppost and the wall of the lamppost is the heat-absorbing power generation vacuum tube (14) with a transparent or translucent tube (16) covered around.

FIG. 2 shows the implementation of the solar power generation system. There are two supports (41) on the lamppost mouth (10) to support the solar photovoltaic board (4), below which there is a power storage device (5) installed. The solar photovoltaic board (4) collects solar power and the electric energy converted from the solar energy can be stored into the power storage device (5). The outer and inner layer of the heat-absorbing power generation vacuum tube (14) is the painted solar cell layer (15) which can strongly absorb the solar energy and convert it to electric energy. The surface of the painted solar cell layer (15) could be the black composite coating layer comprising multilayer solar energy absorbing materials.

Figure 3:
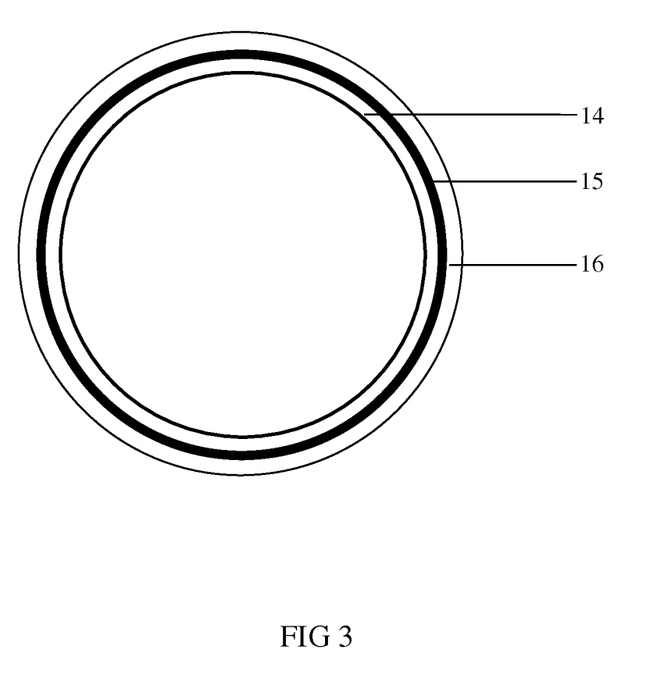
FIG. 3 is a perspective view of the transparent or translucent tube around the heat-absorbing power generation vacuum tube of the LED illuminating street lamp with a power generation system.

FIG. 2 and FIG. 3 show the implementation of the thermal power generation system. A vane wheel generator (3) is mounted in the lamppost mouth (10), the wall of the lamppost (1) is the heat-absorbing power generation vacuum tube (14) with a transparent or translucent tube (16) covered around. At the bottom of the lamppost (1), there are many lamppost feet (12) and heat-absorbing blocks (17). There are also many air holes (13) in the bottom part of the lamppost (1) and the lamppost feet (12) so that the air runs into the lamppost (1).

When sun shines on the lamppost (1), the heat-absorbing power generation vacuum tube (14), the lamppost feet (12) and the heat-absorbing blocks (17) absorb lots of heat, the air temperature in the lamppost (1) is rising rapidly and the air flows fast to the top of the lamppost (1) to drive the vane blades (31) rotating, the vane wheel generator (3) begin generating electricity. The electricity is stored in a power storage device (5) and then be supplied to the LED illuminating street lamp and other electrical appliances. The lamppost feet (12) are hollow and expand from the lamppost (1) in different directions in order to increase the area for receiving the sunshine and absorb much more heat. The outer and inner layer of the heat-absorbing power generation vacuum tube (14) is the painted solar cell layer (15) which can absorb the solar energy to convert it into electricity. Moreover, the said heat-absorbing power generation vacuum tube (14) and the transparent or translucent tube (16) are vacuum so that the heat can be maintained for a long time and can be released in night time to force the air in the lamppost (1) to flow upward to drive the vane wheel generator (3) to generate electricity continuously. The painted solar cell layer (15) can also be installed on the surface of the present street light, with a transparent or translucent tube (16) covered outside, the transparent or translucent tube (16) could be a vacuum tube.

Figure 7:
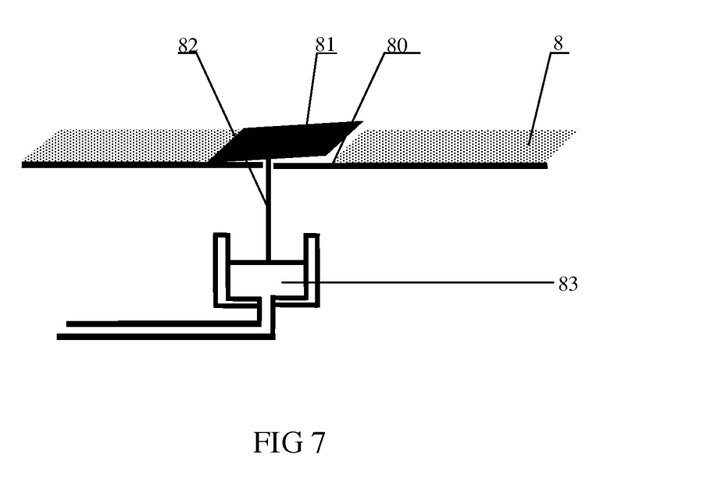
FIG. 7 is the structural view of the air pressure of the road surface pressure device of the LED illuminating street lamp with a power generation system.

As show in FIG. 2 and FIG. 7, the pressure power generation system is an air pressure power generation system. A road surface pressure device is installed beside the lamppost (1), which comprises of road surface layer (8), roadbed (80), a plate (81) in the road surface layer (8), a force pump (82) connected with the plate (81) and located in a tank (83), an air tube (6) at the bottom of the tank (81) which passes through the bottom of the lamppost (1) and goes through the whole lamppost (1) till the lamppost mouth (10), a nozzle (61) at the top of the air tube (6), above which is the vane blades (31) of the vane wheel generator (3). When the automobiles run through the road, the wheels pressure over the plate (81) to press the force pump (82), the force pump (82) compress the air in the tank (83) so that the air rises rapidly through the air tube (6) and spurts out from the nozzle (61) to rotate the vane blade (3) and then the vane wheel generator (3) starts to work to generate electricity.

Figure 4:
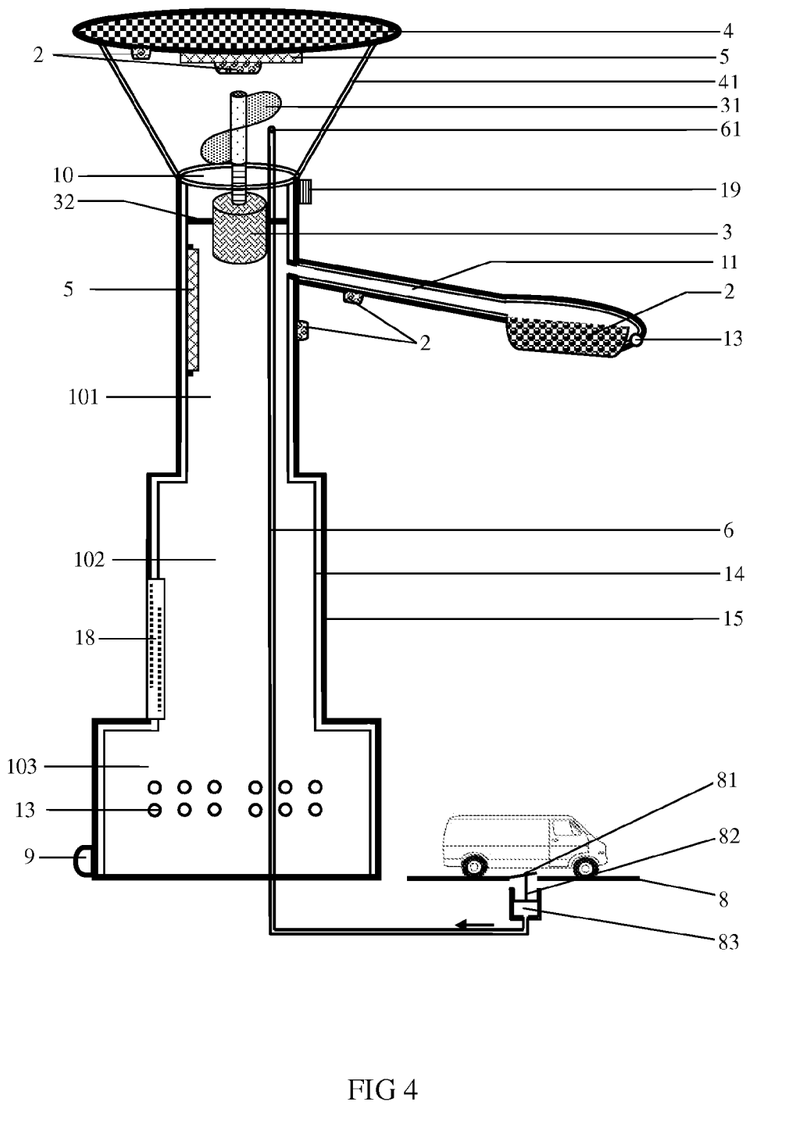
FIG. 4 is another version of the LED illuminating street lamp with a power generation system.

FIG. 4 shows another version of the LED illuminating street lamp with a power generation system, which comprises of a lamppost (1), a lamp bracket (11), a lamppost mouth (10), a heat-absorbing power generation vacuum tube (14), lamppost feet (12), a LED lamp (2), a vane wheel generator (3) is mounted in the lamppost mouth (10). The lamppost (1) is a cylindrical lamppost whose diameter is getting bigger from top to the bottom. The lamppost (1) is consists of three cylinders, the top cylinder (101), the middle cylinder (102) and the bottom cylinder (103). The diameter of the bottom cylinder (103) is bigger than that of the middle cylinder (102), and the diameter of the middle cylinder (102) is bigger that of the top cylinder (101). The LED lamp (2) is installed on the lamp bracket. An air tube (6) is installed in the lamppost (1). There are many air holes (13) in the lamp bracket (11) and the bottom cylinder (103).

As show in FIG. 4, the implementation of the solar power generation system is that there are two supports (41) on the lamppost mouth (10) to support the solar photovoltaic board (4), below which there is a power storage device (5) installed. The solar photovoltaic board (4) collects solar power and the electric energy converted from the solar energy can be stored into the power storage device (5). The outer and inner layer of the heat-absorbing power generation vacuum tube (14) is the painted solar cell layer (15) which can strongly absorb the solar energy and convert it to electric energy. The surface of the painted solar cell layer (15) is the composite coating layer comprising multilayer solar energy absorbing materials.

As show in FIG. 4, the implementation of the thermal power generation system is that a vane wheel generator (3) is mounted in the lamppost mouth (10), the wall of the lamppost (1) is the heat-absorbing power generation vacuum tube (14). There are also many air holes (13) in the bottom part of the lamppost (1) and the lamp bracket (11) so that the air runs into the lamppost (1). When sun shines on the lamppost (1), the heat-absorbing power generation vacuum tube (14) absorbs lots of heat, the air temperature in the lamppost (1) is rising rapidly and the air flows fast to the top of the lamppost (1) to drive the vane blades (31) rotating, the vane wheel generator (3) begin generating electricity. The electricity is stored in a power storage device (5) and then be supplied to the LED illuminating street lamp and other electrical appliances. The features of this version of the invent is that the air volume in the bottom cylinder (103) is much larger than that of the middle cylinder (102), and the air volume in the middle cylinder (102) is much larger than that of the top cylinder, thus, with the promotion of the heat, the air runs faster and faster to the top to drive the vane wheel generator (3).

As show in FIG. 4 and FIG. 7, the pressure power generation system is an air pressure power generation system. A road surface pressure device is installed beside the lamppost (1), which comprises of road surface layer (8), roadbed (80), a plate (81) in the road surface layer (8), a force pump (82) connected with the plate (81) and located in a tank (83), an air tube (6) at the bottom of the tank (81) which passes through the bottom of the lamppost (1) and goes through the whole lamppost (1) till the lamppost mouth (10), a nozzle (61) at the top of the air tube (6), above which is the vane blades (31) of the vane wheel generator (3). When the automobiles run through the road, the wheels pressure over the plate (81) to press the force pump (82), the force pump (82) compress the air in the tank (83) so that the air rises rapidly through the air tube (6) and spurts out from the nozzle (61) to rotate the vane blade (3) and then the vane wheel generator (3) starts to work to generate electricity.

Figure 5:
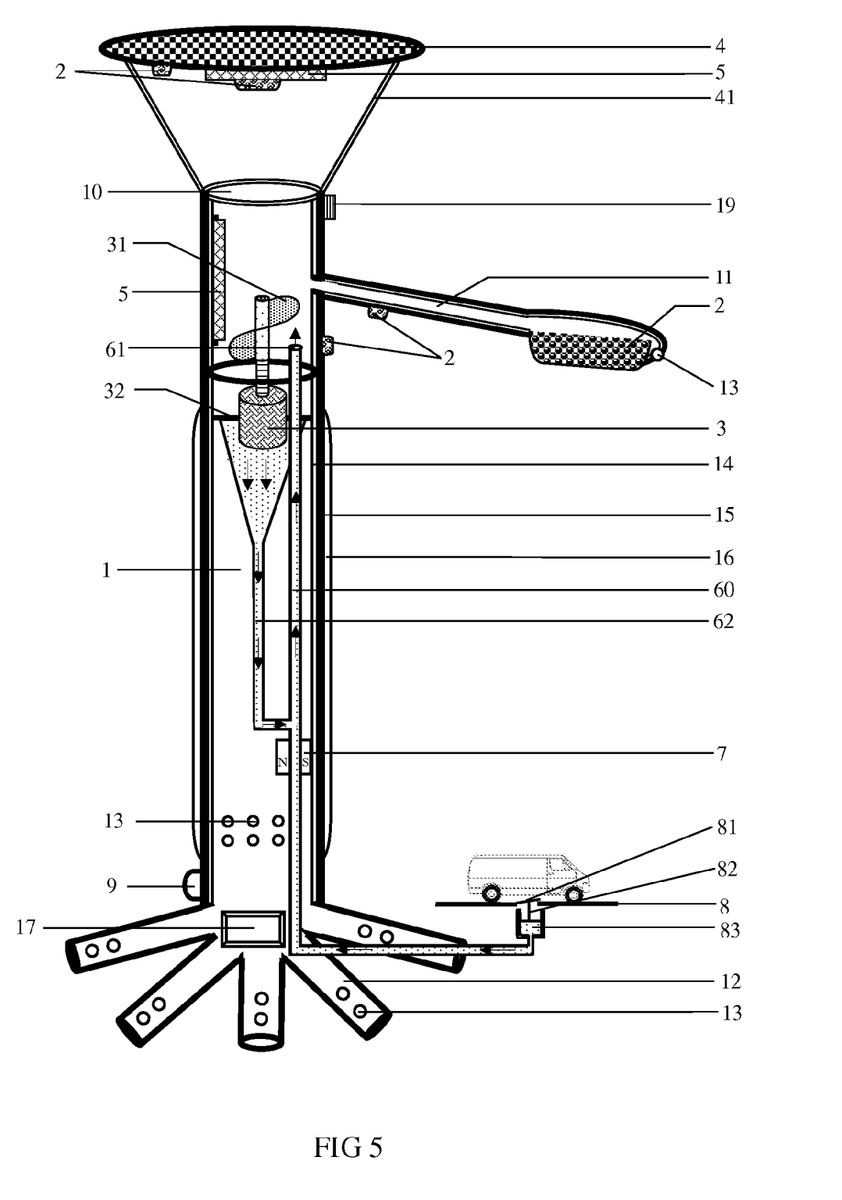
FIG. 5 is the structural view of LED illuminating street lamp with a power generation system, in which the air pressure system is replace by hydraulic pressure magnetic generation system.

FIG. 5 is the structural view of invention, in which the air pressure generation system is replaced by hydraulic pressure magnetic generation system. The LED illuminating street lamp comprises of a lamppost (1), a lamp bracket (11), a lamppost mouth (10), a heat-absorbing power generation vacuum tube (14), lamppost feet (12) and a LED lamp (2), a vane wheel generator (3) is mounted in the lamppost mouth (10), the said LED lamp (2) is installed on the lamp bracket (11), an air tube (6) is installed in the lamppost (1), and there are many air holes (13) in the bottom of the lamppost (1), lamp bracket (11) and lamppost feet (12). The lamppost (1) is a cylindrical lamppost and the wall of the lamppost is the heat-absorbing power generation vacuum tube (14) with a transparent or translucent tube (16) covered around.

As show in FIG. 5, the implementation of the solar power generation system is that there are two supports (41) on the lamppost mouth (10) to support the solar photovoltaic board (4), below which there is a power storage device (5) installed. The solar photovoltaic board (4) collects solar power and the electric energy converted from the solar energy can be stored into the power storage device (5). The outer and inner layer of the heat-absorbing power generation vacuum tube (14) is the painted solar cell layer (15) which can strongly absorb the solar energy and convert it to electric energy.

As show in FIG. 5, the implementation of the thermal power generation system is that a vane wheel generator (3) is mounted in the lamppost mouth (10), the wall of the lamppost (1) is the heat-absorbing power generation vacuum tube (14). There are also many air holes (13) in the bottom part of the lamppost (1), the lamp bracket (11) and the lamp feet (12) so that the air runs into the lamppost (1). When sun shines on the lamppost (1), the heat-absorbing power generation vacuum tube (14) absorbs lots of heat, the air temperature in the lamppost (1) is rising rapidly and the air flows fast to the top of the lamppost (1) to drive the vane blades (31) rotating, the vane wheel generator (3) begin generating electricity.

Figure 8:
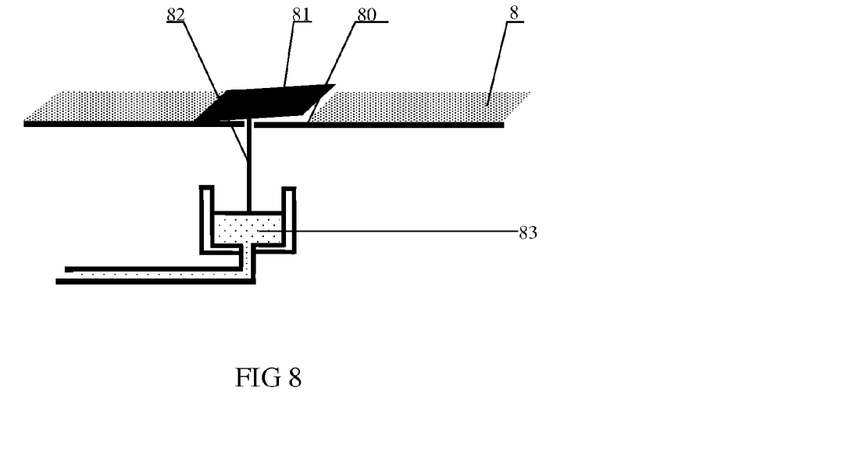
FIG. 8 is the structural view of the hydraulic pressure of the road surface pressure device of the LED illuminating street lamp with a power generation system.

As show in FIG. 5 and FIG. 8, the pressure power generation system is a hydraulic pressure magnetic generation system. The implementation is that there is a road surface pressure device beside the lamppost (1), which comprises of road surface layer (8), roadbed (80), a plate (81) in the road surface layer (8), a force pump (82) connected with the plate (81) and located in a tank (83), magnetic liquid in the tank (83), a magnetic liquid tube (60) at the bottom of the tank (83) which passes through the bottom of the lamppost (1) and goes through the whole lamppost (1) till the lamppost mouth (12), a nozzle (61) at the top of the magnetic liquid tube (60) above which is the vane blades (31) of the vane wheel generator (3), a backflow tube (62) below the vane wheel generator (3), a magnetic generator (7) around the bottom part of the magnetic liquid tube (60). When the automobiles run through the road, the wheels pressure over the plate (81) to press the force pump (82), the force pump (82) compress the magnetic liquid in the tank (83) so that the magnetic liquid rises rapidly through the magnetic liquid tube (60) and spurts out from the nozzle (61) to rotate the vane blade and then the vane wheel generator (3) starts to work to generate electricity. The magnetic generator (7) generates electricity when magnetic liquid passes by. The magnetic liquid spurted out from the nozzle (61) will flow back to the tank (83) along the backflow tube (62).

Figure 6:
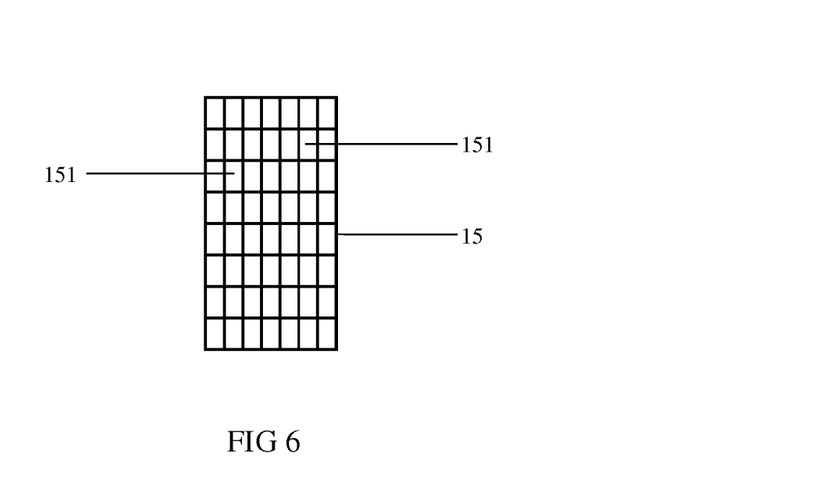
FIG. 6 is the structural view of the painted solar cell layer of the LED illuminating street lamp with a power generation system.

As show in FIG. 6, the said painted solar cell layer (15) is consisted of many painted solar cell slices (151) to be pasted one by one.

As show in FIG. 4 and FIG. 5, an advertising board (18) can be installed in the lamppost (1), and the electric energy stored in the power storage device (5) can supply the power to the advertising board (18). The said advertising board (18) is for the purpose of advertisement and it could also be a kind of illumination light.

As show in FIG. 2 and FIG. 5, the heat-absorbing power generation vacuum tube (14), the lamppost feet (12) can also absorb the heat and light energy from the LED lamp (2).

As show in FIG. 2, FIG. 4 and FIG. 5, the vane wheel generator (3) is fixed on the inner wall of the lamppost (1) by two fixing holders (32). The vane wheel generator (3) is connected with vane blades (31) on the top.

A signal transceiver is installed on the top part of the lamppost (1).

An electrical socket (9) is installed in the bottom of the lamppost (1). The electrical socket (9) is connected into the electrical circuit of the power storage device (5).

Figure 9:
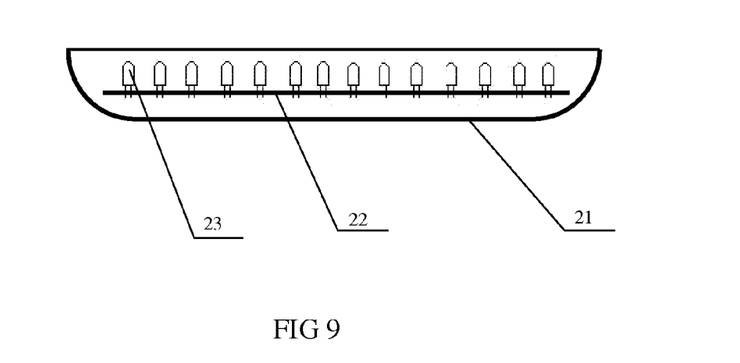
FIG. 9 is the structural view of the LED lamp of the LED illuminating street lamp with a power generation system.
Figure 10:
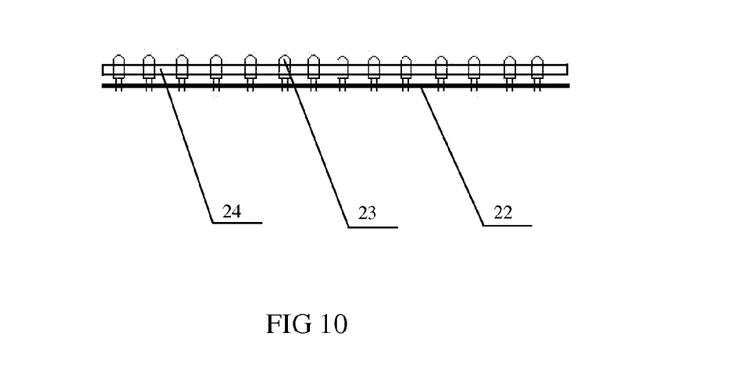
FIG. 10 is the view of the version of LEDs embedded in light-scattering plate of the LED illuminating street lamp with a power generation system.

As show in FIG. 9 and FIG. 10, the LED lamp (2) comprises lamp box (21), PCB board (22), and a plurality of LEDs (23) mounted on the PCB. These LEDs are connected in parallel or in series and can be embedded into a light-scattering plate (24) so that the light can be scattered into different angles. The lamp box (21) is made of transparent or translucent material. The LED (23) can be replaced by organic LED or other illuminating materials, and they can also be replaced by LED chips.

While there have been shown and described what are at present considered to be some of the embodiments of the invention, it will be apparent to those skilled in the art that various changes and modification can be made herein without departing from the scope of the invention as defined by the following claims.

The invention claimed is:

1. A LED illuminating street lamp with power generation system, comprising:
   a LED illuminating street lamp comprised of a lamppost, a lamp bracket, a lamppost mouth, a heat-absorbing power generation vacuum tube on a wall of the lamppost with a vacuum transparent or translucent tube covered around, lamppost feet, a LED lamp installed on a lamp bracket, a vane wheel generator mounted in the lamppost mouth, an air tube or an magnetic liquid tube installed in the lamppost;
   a central controller (MCU);
   a solar power generation system connected with the central controller;
   a thermal power generation system connected with the central controller;
   a pressure power generation system connected with the central controller
   a road surface pressure device connected with the pressure power generation system;
   a rectifier connected with the central controller;
   a DC/DC converter connected with the rectifier; and
   an electric power storage device connected with the DC/DC converter.

2. The LED illuminating street lamp with power generation system of claim 1, wherein the vane wheel generator is fixed on an inner wall of the lamppost by two fixing holders.

3. The LED illuminating street lamp with power generation system of claim 1, wherein the vane wheel generator is connected with vane blades.

4. The LED illuminating street lamp with power generation system of claim 1, wherein the solar power generation system is comprised of a solar photovoltaic board supported by two brackets on the lamppost mouth and a painted solar cell layer on a surface of the heat-absorbing power generation vacuum tube.

5. The LED illuminating street lamp with power generation system of claim 4, wherein the said painted solar cell layer is consisted of many painted solar cell slices to be pasted one by one.

6. The LED illuminating street lamp with power generation system of claim 1, wherein the thermal power generation system is comprised of:
- a vane wheel generator mounted in the lamppost mouth;
- a heat-absorbing power generation vacuum tube with a vacuum transparent or translucent tube covered around;
- lamppost feet and heat-absorbing blocks at a bottom of the lamppost;
- air holes in a bottom part of the lamppost, the lamp bracket and the lamppost feet.

7. The LED illuminating street lamp with power generation system of claim 6, wherein the lamppost feet are hollow and expand from the lamppost in different directions.

8. The LED illuminating street lamp with power generation system of claim 1, wherein the road surface pressure device includes a road surface layer, roadbed, a plate in the road surface layer, a force pump connected with the plate and located in a tank.

9. The LED illuminating street lamp with power generation system of claim 1, wherein the pressure power generation system is an air pressure power generation system comprising:
- a vane wheel generator mounted in the lamppost mouth;
- an air tube in the lamppost which extends to a bottom of a tank;
- a nozzle at a top of the air tube, above which is the vane blades of the vane wheel generator.

10. The LED illuminating street lamp with power generation system of claim 1, wherein the pressure power generation system is a hydraulic pressure magnetic generation system comprising:
- a vane wheel generator mounted in the lamppost mouth;
- the magnetic liquid tube extends to a bottom of a tank;
- the magnetic generator is around a bottom part of the magnetic liquid tube,
- a nozzle at a top of the magnetic liquid tube, above which are vane blades of the vane wheel generator;
- a backflow tube below the vane wheel generator, having an outflow mouth is connected with the magnetic liquid tube on the top of the magnetic generator.

11. The LED illuminating street lamp with power generation system of claim 1, wherein the lamppost is a cylindrical lamppost with a same diameter from top to the bottom.

12. The LED illuminating street lamp with power generation system of claim 1, wherein the lamppost is consists of three cylinders, a top cylinder, a middle cylinder and a bottom cylinder, a diameter of the bottom cylinder is bigger than that of the middle cylinder, and a diameter of the middle cylinder is bigger that of the top cylinder.

13. The LED illuminating street lamp with power generation system of claim 1, wherein the LED lamp comprises lamp box, PCB board, and a plurality of LEDs mounted on the PCB.

14. The LED illuminating street lamp with power generation system of claim 13, wherein the LEDs are embedded into a light-scattering plate.

15. The LED illuminating street lamp with power generation system of claim 13, wherein the lamp box is made of transparent or translucent materials.

16. The LED illuminating street lamp with power generation system of claim 13, wherein the LEDs can be replaced by organic LED or other illuminating materials.

17. The LED illuminating street lamp with power generation system of claim 13, wherein the LEDS can also be replaced by LED chips.

18. The LED illuminating street lamp with power generation system of claim 1, wherein an advertising board is installed in the lamppost, whose circuit is connected with the electric power storage device.

19. The LED illuminating street lamp with power generation system of claim 1, wherein a signal transceiver is installed on the top part of the lamppost.

20. The LED illuminating street lamp with power generation system of claim 1, wherein an electrical socket is installed in the bottom of the lamppost, which is connected into the electrical circuit of the power storage device.

* * * * *